(12) United States Patent
Yang et al.

(10) Patent No.: US 10,584,422 B1
(45) Date of Patent: Mar. 10, 2020

(54) SYNTHETIC AMMONIA SYSTEM FOR MAKING HYDROGEN BY ELECTROLYSIS IN THERMAL POWER PLANT

(71) Applicant: HEPU Technology Development (Beijing) Co., LTD., Beijing (CN)

(72) Inventors: Yusen Yang, Beijing (CN); Hui Chen, Beijing (CN); Hua Cui, Beijing (CN); Bo Xu, Beijing (CN); Zhi Tan, Beijing (CN)

(73) Assignee: HEPU TECHNOLOGY DEVELOPMENT (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/208,588

(22) Filed: Dec. 4, 2018

(51) Int. Cl.
   *C25B 1/04* (2006.01)
   *C01B 3/02* (2006.01)

(52) U.S. Cl.
   CPC .............. *C25B 1/04* (2013.01); *C01B 3/025* (2013.01); *C01B 2203/068* (2013.01)

(58) Field of Classification Search
   CPC ......... C25B 1/00–04; C01B 3/00; C01B 3/02; C01B 3/025; C01B 2203/00; C01B 2203/06; C01B 2203/068
   See application file for complete search history.

(56) References Cited

U.S. PATENT DOCUMENTS

| | | | |
|---|---|---|---|
| 2008/0311022 A1* | 12/2008 | Carrington | C01C 1/0405 423/359 |
| 2011/0024283 A1* | 2/2011 | Peters | C25B 1/04 203/53 |
| 2013/0108534 A1* | 5/2013 | Ostuni | B01D 53/56 423/235 |
| 2016/0138176 A1* | 5/2016 | Yoo | C25B 15/08 204/239 |
| 2016/0194767 A1* | 7/2016 | Mulder | C25B 11/04 205/338 |

* cited by examiner

*Primary Examiner* — Natasha E Young
(74) *Attorney, Agent, or Firm* — Yue (Robert) Xu; Apex Attorneys at Law, LLP

(57) ABSTRACT

The present invention discloses a synthetic ammonia system for making hydrogen by electrolysis in a thermal power plant includes an electrolytic hydrogen making device and a synthetic ammonia equipment; a power input end of the electrolytic hydrogen making device is electrically connected with a power generation output end of the thermal power plant; a hydrogen output end of the electrolysis hydrogen making device is connected with a hydrogen inlet of the synthetic ammonia equipment, a nitrogen inlet of the synthetic ammonia equipment is connected with a nitrogen source, the synthetic ammonia equipment is used for using the hydrogen produced by the electrolysis hydrogen making device and nitrogen of the nitrogen source to synthesize ammonia; an ammonia output end of the synthetic ammonia equipment is communicated to an ammonia supply pipeline and/or a liquid ammonia tank of the thermal power plant.

9 Claims, 3 Drawing Sheets

SYNTHETIC AMMONIA SYSTEM FOR MAKING HYDROGEN BY ELECTROLYSIS IN THERMAL POWER PLANT

CROSS-REFERENCE TO RELATED APPLICATIONS

The present application claims the benefit of priority to Chinese patent application No. 201810922444.9, titled "SYNTHETIC AMMONIA SYSTEM FOR MAKING HYDROGEN BY ELECTROLYSIS IN THERMAL POWER PLANT", filed with the Chinese State Intellectual Property Office on Aug. 14, 2018, the entire disclosure of which is incorporated herein by reference.

FILED OF THE INVENTION

The present invention relates to the field of electrical energy and synthetic ammonia technologies, and in particular to a synthetic ammonia system for making hydrogen by electrolysis in a thermal power plant.

BACKGROUND OF THE INVENTION

At the present stage, in Chinese electrical power systems, there is an abundant electricity production capacity but a lack of a peak regulation power supply such as a gas turbine and pumped storage, so the obvious contradiction occurs between grid peak regulation and thermal power generating unit flexibility, and the ability of grid consuming wind electricity, photoelectricity, hydropower and nuclear power is insufficient.

In a related art, the peak regulation in the thermal power plant has been a salient contradiction in the grid operation. Currently, the Chinese thermal power flexibility peak regulation transformation is targeted at heat supply units in winter. However, how to adjust a peak in summer is a problem many thermal power plants facing. In order to meet the requirement of grid peak regulation, reduce the energy waste during the peak regulation to maximum extent, and make the power plants survive in fierce competition, the deep reformation of peak regulation should be performed.

On the other hand, carbon emission reduction would exert increasing pressure on the thermal power plant. In order to solve the problems of wind and light curtailment, thermal power flexibility peak regulation and carbon emission reduction, it is necessary for thermal power units to solve these problems.

As a most promising hydrogen making technology on a big scale, the electrolytic hydrogen making is efficient and clean, with a simple process and high product purity up to 99.9% (hydrogen and oxygen). Especially, with the increase in the clean power generation, hydrogen will become an ideal carrier for storing electric energy. By implementing the clean power generation and applying the water-electrolytic hydrogen making technology, the electric energy generated by the clean energy is converted into hydrogen energy to be stored, or as needed, the hydrogen energy is converted into methane, methyl alcohol and other liquid fuel by the subsequent chemical process.

Ammonia is a very important chemical product for human. With the social development and progress in industrial civilization, a synthetic ammonia product has obvious contributions to human. As hydrogen storage fuel which is transported conveniently, many research units and energy companies think that ammonia is promising. Ammonia may be liquefied at a temperature of 20 degrees centigrade below zero, and thus may be transported conveniently with low costs; in addition, ammonia is also a fuel and refrigerant, not only for burning, but also for cooling. Currently, ammonia is mainly used for a SCR denitration system.

SUMMARY OF THE INVENTION

In view of defects in the related art, the present invention is directed to providing a synthetic ammonia system for making hydrogen by electrolysis in a thermal power plant, which implements electrolytic hydrogen making and space division nitrogen and oxygen making by using peak regulation and frequency modulation power, then produces ammonia by the synthetic ammonia process using the resultant nitrogen and hydrogen, such that the power plant turns into an electrochemical plant of various gas and fuel products.

In order to realize the above purpose, the present invention utilizes the following technical solutions.

A synthetic ammonia system for making hydrogen by electrolysis in a thermal power plant includes an electrolytic hydrogen making device and a synthetic ammonia equipment; a power input end of the electrolytic hydrogen making device is electrically connected with a power generation output end of the thermal power plant, so as to use peak regulation balance electric quantity of the thermal power plant to produce hydrogen and oxygen for power supply electrolysis; a hydrogen output end of the electrolysis hydrogen making device is connected with a hydrogen inlet of the synthetic ammonia equipment, a nitrogen inlet of the synthetic ammonia equipment is connected with a nitrogen source, the synthetic ammonia equipment is used for using the hydrogen produced by the electrolysis hydrogen making device and nitrogen of the nitrogen source to synthesize ammonia; an ammonia output end of the synthetic ammonia equipment is communicated to an ammonia supply pipeline and/or a liquid ammonia tank of the thermal power plant.

Further, the ammonia supply pipeline is communicated to a multifuel burner of a hearth of a boiler of the thermal power plant, for taking part in the hearth burning as fuel, and/or into a SCR working surface of a flue gas cleaning denitration device at a rear gas flue of the boiler of the thermal power plant.

Further, the nitrogen source includes a space division device, a power input end of the space division device is connected to a power generation output end of the thermal power plant, so as to obtain the peak regulation balance electric quantity of the thermal power plant as a power supply, and a nitrogen output end is connected with a nitrogen inlet of the synthetic ammonia equipment.

Further, an oxygen output end of the electrolysis hydrogen making device is communicated with an oxygen storage tank; a hydrogen output end of the electrolysis hydrogen making device is connected to a hydrogen storage tank by an ultralow temperature liquefying device or a high pressure gas compression device, for outputting the hydrogen which is not input to the synthetic ammonia equipment in a state of ultralow temperature liquid hydrogen or high pressure compression gaseous hydrogen to the hydrogen storage tank.

Further, a hydrogen output end of the electrolysis hydrogen making device or the hydrogen storage tank is communicated to an external hydrogen transporting pipeline, and directly transports the hydrogen externally by the external hydrogen transporting pipeline.

Further, an oxygen output end of the space division device is communicated to an oxygen storage tank, and a nitrogen output end of the space division device is also communicated to the nitrogen storage tank, for outputting nitrogen which is not input to the synthetic ammonia equipment to the nitrogen storage tank.

Further, the electrolysis hydrogen making device is alkaline aqueous solution type, a solid polymer type or a high temperature solid oxide type.

Further, a water inlet of the electrolysis hydrogen making device is communicated with a chemical water treatment workshop of the thermal power plant by a make-up pump, and the chemical water treatment workshop of the thermal power plant is communicated with the make-up pump by a purified water preparing device.

The present invention further provides a peak regulation and frequency modulation electrochemical plant, which has the above-mentioned synthetic ammonia system for making hydrogen by electrolysis in a thermal power plant, with a resultant product of one or more of electric power, thermal power, hydrogen, nitrogen, oxygen and ammonia, which is connected to the corresponding gas storage device by a gas purifying device respectively, so as to implement low temperature liquidation or high pressure storage of one or more of hydrogen, nitrogen, oxygen and ammonia.

Further, the production device for one or more of hydrogen, nitrogen, oxygen and ammonia is connected with the corresponding high pressure or low temperature liquefied petroleum gas cylinder bottling device by the gas purifying device, which may sell one or more of the gaseous products of hydrogen, nitrogen, oxygen and ammonia.

The present invention has the beneficial effects that by the above-mentioned synthetic ammonia system for making hydrogen by electrolysis in a thermal power plant, which implements hydrogen and nitrogen making in the power plant by taking full advantage of peak regulation and frequency modulation power, then produces ammonia by the synthetic ammonia process using the resultant nitrogen and hydrogen, such that the thermal power plant turns into an electrochemical plant of various gas and fuel products (ammonia and hydrogen is taken as fuel to replace coal, and various gases such as hydrogen, nitrogen, ammonia and oxygen may be on sale and output). Especially, hydrogen and ammonia is taken as fuel with zero carbon emission, certainly with broad application prospects in the future.

The synthetic ammonia system for making hydrogen by electrolysis in a thermal power plant according to the present invention acquires electric energy at a low ebb, converts its electric energy into hydrogen energy, and then performs synthetic ammonia process on hydrogen energy and nitrogen, thereby converting hydrogen energy into chemical energy of ammonia fuel easy to transport and store, which not only realize electric energy storage in disguised form, but also transform the traditional thermal power plant into an energy plant for producing various gaseous products.

In addition, the synthetic ammonia system for making hydrogen by electrolysis in a thermal power plant according to the present invention may directly consume the peak regulation balance electric quantity of the power plant, indirectly uses wind, light, water and nuclear power curtailment, alleviates the problems of grid balance and peak and valley difference, prolongs the service life of the power plant equipment, implements the disguised storage of electricity energy, and realizes the stable storage of energy and effective usage.

DETAILED DESCRIPTION OF THE EMBODIMENTS

The present invention will be further described in combination with drawings. It should be noted that the embodiment provides detailed implementation modes and specific operation process by taking the present technical solution as a premise. However, the protection scope of the present invention is not limited the present embodiment.

First Embodiment

Figure 1:
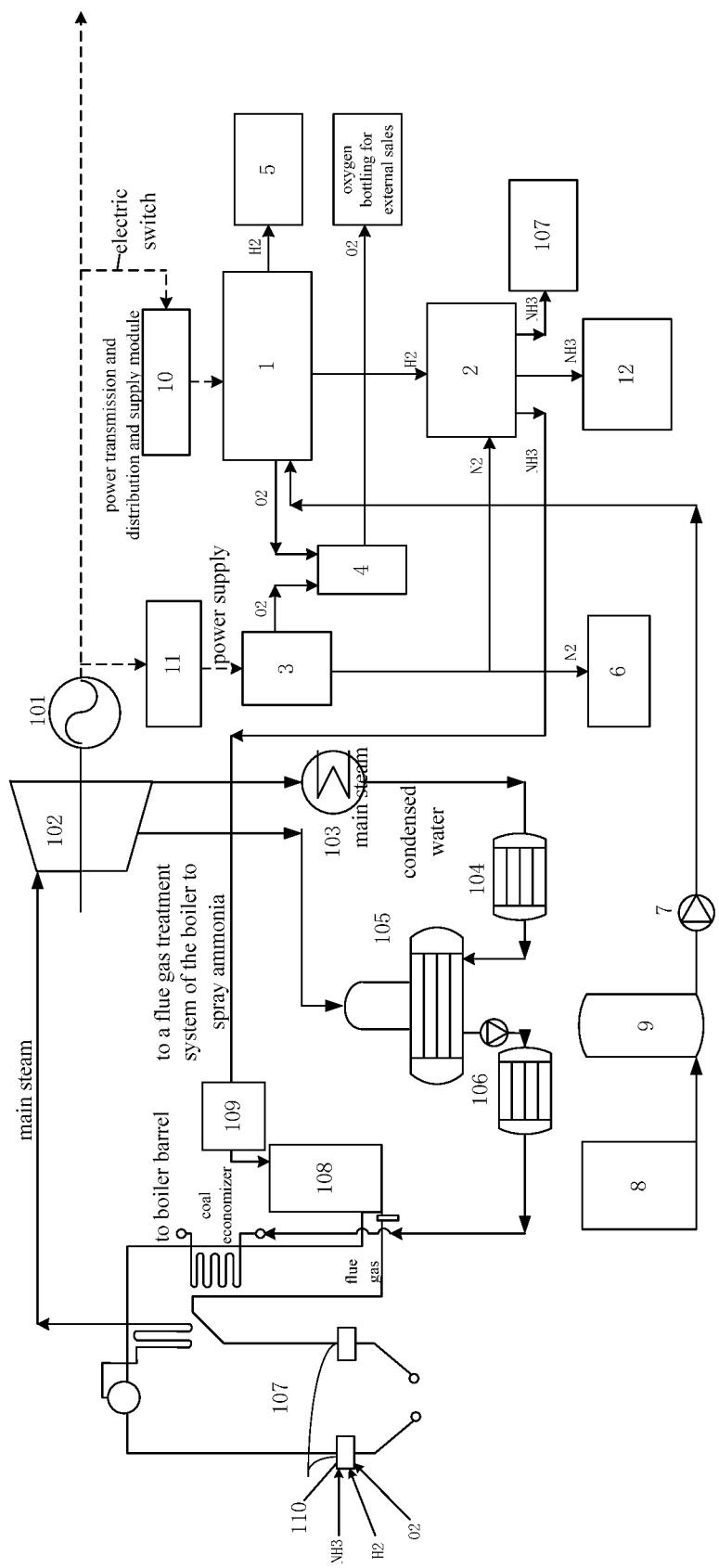
FIG. 1 is a structural schematic diagram of a first embodiment according to the present invention.

As shown in FIG. 1, a synthetic ammonia system for making hydrogen by electrolysis in a thermal power plant includes an electrolytic hydrogen making device 1 and a synthetic ammonia equipment 2; a power input end of the electrolytic hydrogen making device 1 is electrically connected with a power generation output end of the thermal power plant; a hydrogen output end of the electrolysis hydrogen making device 1 is connected with a hydrogen inlet of the synthetic ammonia equipment 2, a nitrogen inlet of the synthetic ammonia equipment 2 is connected with a nitrogen source; an ammonia output end of the synthetic ammonia equipment 2 is communicated to an ammonia supply pipeline and a liquid ammonia tank 12 of the thermal power plant. The ammonia supply pipeline may include an ammonia supply pipeline and a liquid ammonia supply pipeline.

The above-mentioned synthetic ammonia system for making hydrogen by electrolysis in a thermal power plant has the following working principal. Usually, a grid control center sends a peak regulation load instruction to a power plant centralized control center of the thermal power plant according to a real-time power generation and peak regulation load requirement in a region, and the centralized control center of the thermal power plant controls and adjusts the peak regulation and frequency modulation balance electricity quantity of the thermal power plant according to the peak regulation load instruction. In the above-mentioned synthetic ammonia system for making hydrogen by electrolysis in a thermal power plant, the peak regulation and frequency modulation balance electric quantity of the thermal power plant provides power supply for the electrolysis hydrogen making device, and the hydrogen made by the electrolysis hydrogen making device is transported to the synthetic ammonia equipment. After the synthetic ammonia equipment obtains hydrogen from the electrolysis hydrogen making device and nitrogen from a nitrogen source, and makes ammonia at a high temperature and a high pressure, the ammonia supply pipeline of the thermal power plant provides the ammonia to various systems needing ammonia of the thermal power plant. The extra ammonia may be stored in the liquid ammonia storage tank 12, is liquefied at a low temperature to the liquid ammonia, and bottled to be on sale.

With the above-mentioned synthetic ammonia system for making hydrogen by electrolysis in a thermal power plant, the hydrogen prepared by the peak regulation and frequency modulation balance electric quantity of the thermal power plant may be used to synthesize into ammonia, thereby providing ammonia for various systems needing ammonia of the thermal power plant, and realizes cyclic utilization and transformation of energy.

Usually, a power generation device of the thermal power plant is a thermal power generation unit, including an electric generator 101, a steam turbine 102, a condenser 103, a low pressure heater 104, a deaerator 105, a high pressure heater 106 and a boiler 107; a power input end of the electrolysis hydrogen making device 1 is connected to a power output end of the electric generator 101, and the electric generator 101 provides a power supply for the electrolysis hydrogen making device 1 using the peak regulation and frequency modulation balance electric quantity.

Further, the ammonia supply pipeline is communicated to a multifuel burner 110 of a hearth of a boiler 107 of the thermal power plant, for taking part in the hearth burning as fuel, and/or into a SCR working surface 108 of a flue gas cleaning denitration device at a rear gas flue of the boiler of the thermal power plant.

The ammonia enters the multifuel burner of the hearth of the boiler to be fuel and burnt in the hearth, partially replacing coal, which may reduce the boiler coal amount and $CO_2$ emission load. The liquid ammonia leads to the SCR working surface of a flue gas cleaning denitration device, and performs ammonia spraying process on the SCR working surface. In the present embodiment, the liquid ammonia supply pipeline firstly leads to the ammonia spraying device 109, and to the SCR working surface by the ammonia spraying device.

The nitrogen in the nitrogen source may be directly purchased on the market. In the present embodiment, the nitrogen source includes a space division device 3, and a power input end of the space division device 3 is connected to a power generation output end (the electric generator 101 in the present embodiment) of the thermal power plant, and a nitrogen output end is connected with a nitrogen inlet of the synthetic ammonia equipment 2.

The space division device 3 is used to make nitrogen, by taking the peak regulation and frequency modulation balance electric quantity of the thermal power plant as the electric energy source, which may save the cost of purchasing nitrogen on the market, further taking full advantage of the balance electric quantity of the thermal power plant, and improving energy utilization rate. In practical applications, a copious cooling space division nitrogen making device, a pressure swing adsorption space division device or a film separation space division device may be used.

Further, an oxygen output end of the electrolysis hydrogen making device 1 is communicated with one oxygen storing tank 4. Further, the oxygen output end of the space division device 3 is also connected to the above-mentioned oxygen storing tank 4. The oxygen generated during the hydrogen and nitrogen making process is stored in the oxygen storage tank, is on sale after bottled, and may also provide oxygen for the boiler burning.

A hydrogen output end of the electrolysis hydrogen making device 1 is also connected to a hydrogen storage tank 5 by an ultralow temperature liquefying device or a high pressure gas compression device, for outputting the hydrogen which is not input to the synthetic ammonia equipment in a state of ultralow temperature liquid hydrogen or high pressure compression gaseous hydrogen to the hydrogen storage tank 5. The hydrogen not used for preparing ammonia immediately during the hydrogen making may be firstly stored in the hydrogen storage tank 5, which not only provides fuel for the boiler burning, but also may be on sale, providing hydrogen for the subsequent ammonia preparation.

Further, a hydrogen output end of the electrolysis hydrogen making device or a hydrogen storage tank may also be communicated to an external hydrogen transporting pipeline, and directly transports the hydrogen externally by the external hydrogen transporting pipeline.

The electrolysis hydrogen making device 1 and the space division device 3 may introduce hydrogen and nitrogen to the synthetic ammonia equipment 2 through a flow valve respectively. The flow valve may introduce hydrogen and nitrogen into the synthetic ammonia equipment according to a preset ratio of hydrogen to nitrogen, which not only ensures effects of making ammonia, but also not wastes hydrogen and nitrogen.

Further, a nitrogen output end of the space division device 3 is also communicated to a nitrogen storage tank 6, for outputting nitrogen which is not input to the synthetic ammonia equipment to the nitrogen storage tank 6. Similarly, the hydrogen not used for preparing ammonia immediately during the hydrogen making may be firstly stored in the nitrogen storage tank 6, which may not only be bottled to be on sale, but also provide nitrogen for the subsequent ammonia preparation.

Further, the electrolysis hydrogen making device 1 may be an alkaline aqueous solution type, a solid polymer type or a high temperature solid oxide type.

Further, a water inlet of the electrolysis hydrogen making device 1 is communicated with a chemical water treatment workshop 8 by a make-up pump 7, and the chemical water treatment workshop 8 of the thermal power plant is communicated with the make-up pump 7 by a purified water preparing device 9.

Further, the electric generation output end of the thermal power plant (the output end of the electric generator 101 in the present embodiment) is electrically connected to a power supply input end of the electrolysis hydrogen making device 1 through an inverter 10, and the generator output end of the thermal power plant is also electrically connected with the power supply input end of the space division device 3 through another inverter 11.

The synthetic ammonia equipment 2 may be communicated with the ammonia supply pipeline through the ammonia flow control valve.

Second Embodiment

Figure 2:
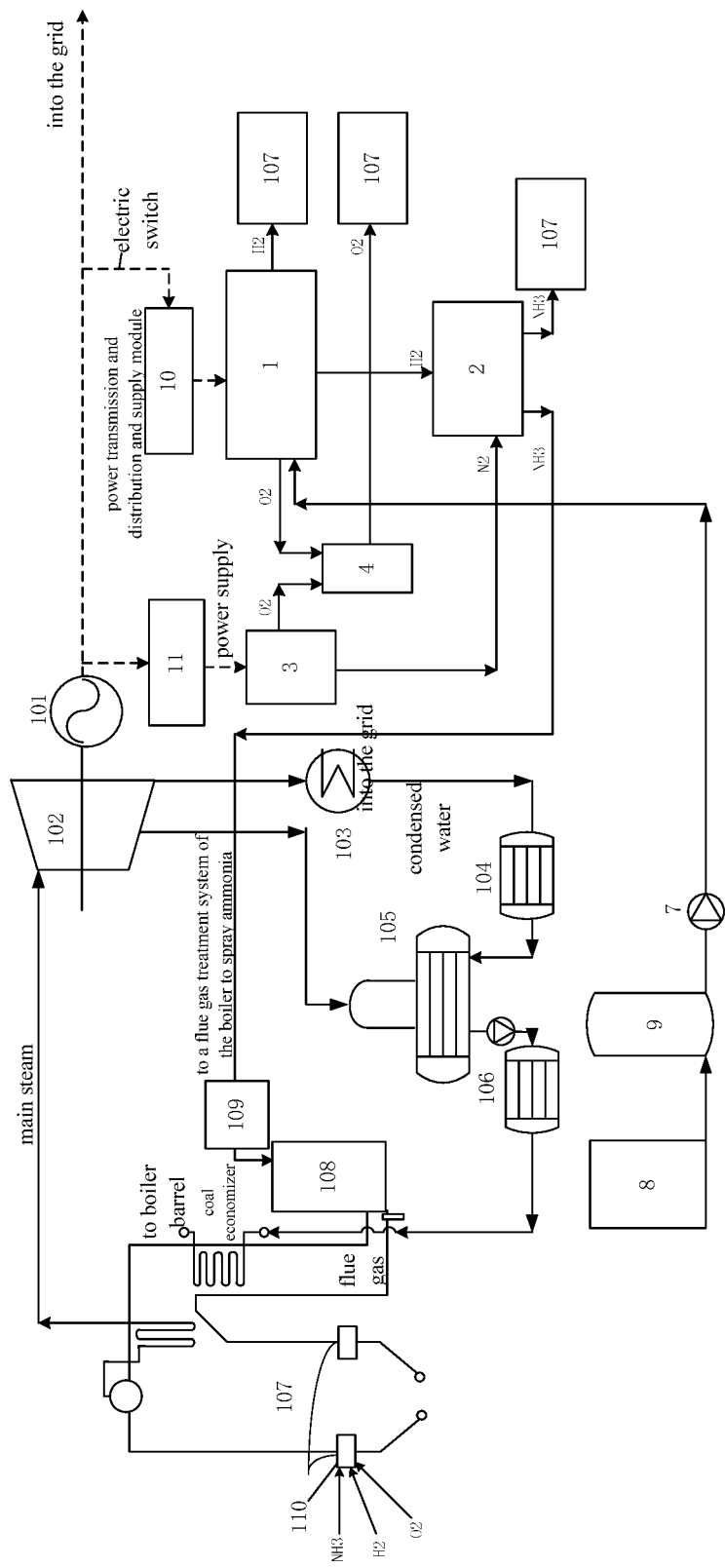
FIG. 2 is a structural schematic diagram of a second embodiment according to the present invention.

As shown in FIG. 2, in the present embodiment, a grid control center sends a peak regulation load instruction to a power plant centralized control center of the thermal power plant according to a real-time power generation and peak regulation load requirement in a region, and the centralized control center of the thermal power plant controls and adjusts the peak regulation and frequency modulation balance electricity quantity of the thermal power plant according to the peak regulation load instruction. The peak regulation and frequency modulation balance electric quantity of the thermal power plant provides power supply for the electrolysis hydrogen making device 1 by the electric generation device of the thermal power plant, and the hydrogen made by the electrolysis hydrogen making device is transported to the synthetic ammonia equipment 2.

The nitrogen is made by the space division device 3, a power input end of the space division device 3 is connected to a power generation output end (the output end of the electric generator 101 in the present embodiment) of the thermal power plant, and a nitrogen output end is connected with a nitrogen inlet of the synthetic ammonia equipment 2. The electric generation device may provide a power supply for the space division device 3 using balance electric quantity.

After the synthetic ammonia equipment obtains hydrogen from the electrolysis hydrogen making device and nitrogen from a nitrogen source, ammonia is made at a high temperature and a high pressure, and is provided to various systems needing ammonia of the thermal power plant by the ammonia supply pipeline of the thermal power plant.

The liquid ammonia enters the hearth of the boiler 107 to be fuel and burnt in the hearth, partially replacing coal, which may reduce the boiler coal amount and $CO_2$ emission load. In addition, the liquid ammonia leads to the ammonia spraying device 109, and is sprayed into the SCR working surface of a flue gas cleaning denitration device, performing ammonia spraying process on the SCR working surface.

In the present embodiment, the extra hydrogen and the resultant oxygen in the electrolysis hydrogen making device 1 lead to the multifuel burner 110 of the hearth of the boiler 107 for supporting and stabilizing combustion. The oxygen realizes oxygen-enriched combustion of the boiler.

The chemical water treatment workshop 8 of the thermal power plant leads the treated chemical water to the purified water preparation device 9. After the purified water preparation device 9 makes purified water, the make-up pump pumps the purified water to the electrolysis hydrogen making device as raw water.

In the present embodiment, various gaseous products prepared by the power plant are all used for the power plant system, without external sales.

Third Embodiment

Figure 3:
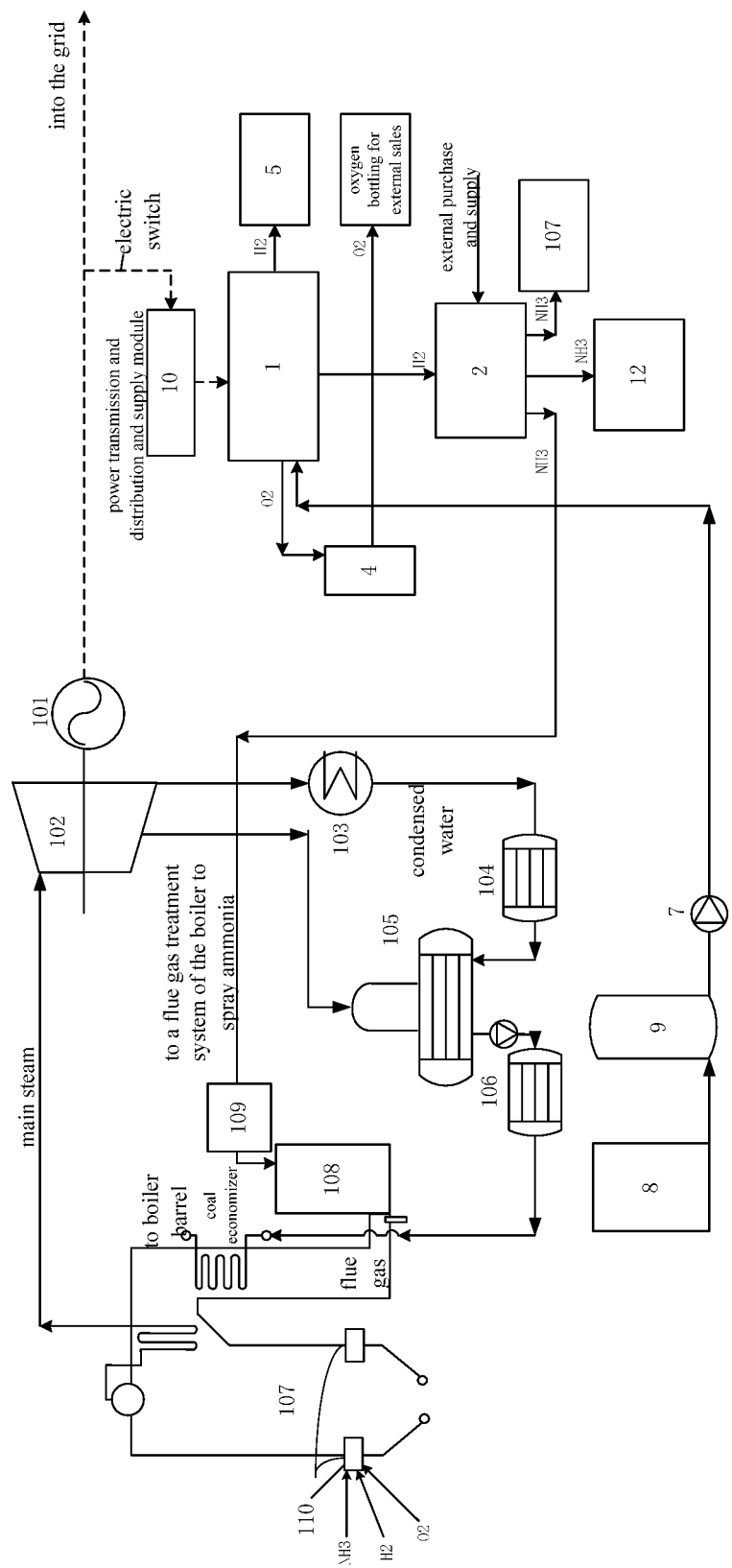
FIG. 3 is a structural schematic diagram of a third embodiment according to the present invention.

As shown in FIG. 3, the constitution of the present embodiment is substantially the same as that in the first embodiment, with the main difference in that in the present embodiment, there is no space division device, all nitrogen may be purchased directly externally, and the oxygen is generated from the electrolysis hydrogen making device. Other constitutions and functions as well as final products of the system are substantially the same as those in the first embodiment.

According to the above-mentioned technical solution and conception, persons skilled in the art make various changes and alternations which should fall within the protection scope of the claims of the present invention.

What is claimed is:

1. A synthetic ammonia system for making hydrogen by electrolysis in a thermal power plant, comprising an electrolytic hydrogen making device and a synthetic ammonia equipment; a power input end of the electrolytic hydrogen making device is electrically connected with a power generation output end of the thermal power plant, so as to use peak regulation balance electric quantity of the thermal power plant to produce hydrogen and oxygen for power supply electrolysis; a hydrogen output end of the electrolysis hydrogen making device is connected with a hydrogen inlet of the synthetic ammonia equipment, a nitrogen inlet of the synthetic ammonia equipment is connected with a nitrogen source, the synthetic ammonia equipment is used for using the hydrogen produced by the electrolysis hydrogen making device and nitrogen of the nitrogen source to synthesize ammonia; an ammonia output end of the synthetic ammonia equipment is communicated to an ammonia supply pipeline and/or a liquid ammonia tank of the thermal power plant; the ammonia supply pipeline is communicated to a multifuel burner of a hearth of a boiler of the thermal power plant, for taking part in the hearth burning as fuel, and/or into a SCR working surface of a flue gas cleaning denitration device at a rear gas flue of the boiler of the thermal power plant.

2. The synthetic ammonia system for making hydrogen by electrolysis in a thermal power plant according to claim 1, wherein the nitrogen source includes a space division device, a power input end of the space division device is connected to a power generation output end of the thermal power plant, so as to obtain the peak regulation balance electric quantity of the thermal power plant as a power supply, and a nitrogen output end is connected with a nitrogen inlet of the synthetic ammonia equipment.

3. The synthetic ammonia system for making hydrogen by electrolysis in a thermal power plant according to claim 2, wherein an oxygen output end of the space division device is communicated to an oxygen storage tank, and a nitrogen output end of the space division device is also communicated to the nitrogen storage tank, for outputting nitrogen which is not input to the synthetic ammonia equipment to the nitrogen storage tank.

4. The synthetic ammonia system for making hydrogen by electrolysis in a thermal power plant according to claim 1, wherein an oxygen output end of the electrolysis hydrogen making device is communicated with an oxygen storage tank; a hydrogen output end of the electrolysis hydrogen making device is connected to a hydrogen storage tank by an ultralow temperature liquefying device or a high pressure gas compression device, for outputting the hydrogen which is not input to the synthetic ammonia equipment in a state of ultralow temperature liquid hydrogen or high pressure compression gaseous hydrogen to the hydrogen storage tank.

5. The synthetic ammonia system for making hydrogen by electrolysis in a thermal power plant according to claim 4, wherein a hydrogen output end of the electrolysis hydrogen making device or the hydrogen storage tank is communicated to an external hydrogen transporting pipeline, and directly transports the hydrogen externally by the external hydrogen transporting pipeline.

6. The synthetic ammonia system for making hydrogen by electrolysis in a thermal power plant according to claim 1, wherein the electrolysis hydrogen making device is alkaline aqueous solution type, a solid polymer type or a high temperature solid oxide type.

7. The synthetic ammonia system for making hydrogen by electrolysis in a thermal power plant according to claim 1, wherein a water inlet of the electrolysis hydrogen making device is communicated with a chemical water treatment workshop of the thermal power plant by a make-up pump, and the chemical water treatment workshop of the thermal power plant is communicated with the make-up pump by a purified water preparing device.

8. A peak regulation and frequency modulation electrochemical plant, comprising the synthetic ammonia system for making hydrogen by electrolysis in a thermal power plant according to claim 1, with a resultant product of one or more of electric power, thermal power, hydrogen, nitrogen, oxygen and ammonia, which is connected to a corresponding gas storage device by a gas purifying device respectively, so as to implement low temperature liquidation or high pressure storage of one or more of hydrogen, nitrogen, oxygen and ammonia.

9. The peak regulation and frequency modulation electrochemical plant according to claim 8, wherein a production device for one or more of hydrogen, nitrogen, oxygen and ammonia is connected with the corresponding high pressure or low temperature liquefied petroleum gas cylinder bottling device by the gas purifying device, which may sell one or more of the gaseous products of hydrogen, nitrogen, oxygen and ammonia.

* * * * *